United States Patent
Niederauer et al.

(10) Patent No.: US 8,368,702 B2
(45) Date of Patent: Feb. 5, 2013

(54) POLICY-BASED SWITCHING BETWEEN GRAPHICS-PROCESSING UNITS

(75) Inventors: Christopher C. Niederauer, San Francisco, CA (US); Geoffrey G. Stahl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 12/695,265

(22) Filed: Jan. 28, 2010

(65) Prior Publication Data

US 2011/0164046 A1 Jul. 7, 2011

Related U.S. Application Data

(60) Provisional application No. 61/292,721, filed on Jan. 6, 2010.

(51) Int. Cl.
*G06F 15/16* (2006.01)
*G06F 15/00* (2006.01)
*G06T 1/00* (2006.01)

(52) U.S. Cl. ........................................ 345/502; 345/501
(58) Field of Classification Search .................. 345/501, 345/502
See application file for complete search history.

(56) References Cited

U.S. PATENT DOCUMENTS

| | | | |
|---|---|---|---|
| 4,862,156 A | 8/1989 | Westberg | |
| 5,943,064 A | 8/1999 | Hong | |
| 6,850,240 B1 | 2/2005 | Jones, Jr. | |
| 7,522,167 B1 * | 4/2009 | Diard et al. | 345/502 |
| 7,698,579 B2 * | 4/2010 | Hendry et al. | 713/300 |
| 8,199,155 B2 * | 6/2012 | Leroy et al. | 345/502 |
| 2006/0119603 A1 * | 6/2006 | Chen et al. | 345/502 |
| 2008/0030509 A1 * | 2/2008 | Conroy et al. | 345/502 |
| 2008/0034238 A1 | 2/2008 | Hendry et al. | |
| 2008/0129699 A1 | 6/2008 | Cho | |
| 2008/0204460 A1 * | 8/2008 | Marinkovic et al. | 345/502 |
| 2009/0153528 A1 | 6/2009 | Orr | |
| 2009/0153540 A1 * | 6/2009 | Blinzer et al. | 345/212 |

FOREIGN PATENT DOCUMENTS

| | | |
|---|---|---|
| WO | 2007140404 A2 | 12/2007 |
| WO | 2009038902 A1 | 3/2009 |

* cited by examiner

*Primary Examiner* — Jacinta M Crawford
(74) *Attorney, Agent, or Firm* — Wong, Cabello, Lutsch, Rutherford & Brucculeri, LLP (57) ABSTRACT

The disclosed embodiments provide a system that configures a computer system to switch between graphics-processing units (GPUs). In one embodiment, the system drives a display using a first graphics-processing unit (GPU) in the computer system. Next, the system detects one or more events associated with one or more dependencies on a second GPU in the computer system. Finally, in response to the event, the system prepares to switch from the first GPU to the second GPU as a signal source for driving the display.

20 Claims, 5 Drawing Sheets

POLICY-BASED SWITCHING BETWEEN GRAPHICS-PROCESSING UNITS

RELATED APPLICATION

This application hereby claims priority under 35 U.S.C. §119 to U.S. Provisional Patent Application No. 61/292,721, filed on 6 Jan. 2010, entitled "Policy-Based Switching Between Graphics-Processing Units," by inventors Christopher C. Niederauer and Geoff Stahl.

BACKGROUND

1. Field

The disclosed embodiments relate to techniques for switching between graphics-processing units (GPUs) in a computer system. More specifically, the disclosed embodiments relate to techniques for policy-based switching between GPUs in a computer system.

2. Related Art

Power management is critically important for many electronic devices. For example, portable electronic devices such as laptop computers, mobile phones, and personal digital assistants (PDAs) need to conserve power to operate for any length of time on battery power. At the same time, many of these portable electronic devices are beginning to incorporate high-resolution, high-power graphics technology. Rapid developments in this area have led to significant advances in 2D and 3D graphics technology, providing users with increasingly sophisticated visual experiences in domains ranging from graphical user interfaces to realistic gaming environments. Underlying many of these improvements is the development of dedicated graphics-rendering devices, or graphics-processing units (GPUs). A typical GPU includes a highly parallel structure that efficiently manipulates graphical objects by rapidly performing a series of primitive operations and displaying the resulting images on graphical displays.

Unfortunately, there are costs associated with these increased graphics capabilities. In particular, an increase in graphics performance is typically accompanied by a corresponding increase in power consumption. Consequently, many computer systems and portable electronic devices may devote a significant amount of their power to support high-performance GPUs, which may decrease battery life and cause heat dissipation problems.

One solution to this problem is to save power during low-activity periods by switching from a high-power GPU that provides higher performance to a low-power GPU with lower performance. Computer system designers are beginning to develop hardware structures to support such systems. However, it remains a challenging problem to determine precisely when to switch between low-power and high-power GPUs.

Hence, what is needed is a method and an apparatus that facilitates determining when to switch between GPUs in a system with multiple GPUs.

SUMMARY

The disclosed embodiments provide a system that configures a computer system to switch GPUs. During operation, the system drives a display using a first graphics-processing unit (GPU) in the computer system. Next, the system detects, through application programming interfaces (APIs) or system events related to the GPU, an event associated with a dependency on a second GPU in the computer system. In response to the detection, the system initiates a switch from the first GPU to the second GPU as a signal source for driving the display.

In some embodiments, the API is associated with a graphics library, video playback, or a window manager.

In some embodiments, the dependency corresponds to at least one of:
(i) use of the graphics library in the computer system;
(ii) video playback of decodable content;
(iii) a request to switch from the first GPU to the second GPU; and
(iv) a user preference associated with graphical performance in the computer system.

In some embodiments, the request is made to the window manager or the graphics library.

In some embodiments, parts of the system, such as the window manager, are able to control switching between GPUs to compensate for processes or events that might otherwise cause a switch between GPUs.

In some embodiments, use of the graphics library involves at least one of:
(i) linking to the graphics library;
(ii) loading of the graphics library during application execution; and
(iii) method calls to the graphics library.

In some embodiments, the event is at least one of:
(i) initialization of an application associated with the dependency on the second GPU;
(ii) invocation of the request to switch from the first GPU to the second GPU;
(iii) use of the graphics library; and
(iv) video playback of the decodable content.

In some embodiments, the system also switches the signal source back to the first GPU after all dependencies on the second GPU are removed.

In some embodiments, the first GPU is a low-power GPU which is integrated into a system chipset, and the second GPU is a high-power GPU which resides on a discrete GPU chip. The first GPU and the second GPU can have substantially identical circuitry and similar capabilities, or dissimilar circuitry and/or capabilities.

In some embodiments, the first GPU is a general-purpose processor running graphics code, and the second GPU is a special-purpose GPU.

In some embodiments, the "offline" GPU, which is presently not driving the display, can be used to perform other tasks. For example, an online integrated GPU can be dedicated to the window manager's user interface (UI) while an application performs work asynchronously using the discrete GPU.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for switching between multiple graphics-processing units (GPUs) in a computer system. The computer system may correspond to a laptop computer, personal computer, workstation, and/or portable electronic device containing an embedded GPU and a discrete GPU. The embedded GPU may consume less power than the discrete GPU, while the discrete GPU may provide better graphics performance than the embedded GPU. As a result, the rendering and display of graphics in the computer system may involve a tradeoff between performance and power savings.

More specifically, embodiments provide methods and systems for policy-based switching between multiple GPUs in the computer system. The policy may associate events in the computer system with dependencies on individual GPUs; events associated with higher graphical performance requirements may have dependencies on more powerful GPUs, while events associated with lower graphical performance requirements may have dependencies on less powerful GPUs and/or the removal of dependencies on more powerful GPUs. (Note that an event can generally include any change in the hardware or software operating state of the computer system, whereas a dependency is an association between an event and the use of a specific GPU.) For example, an event with a dependency on a discrete GPU may trigger a switch from an embedded GPU to the discrete GPU to drive the display of the computer system. Dependencies on GPUs may also be based on user preferences associated with graphical performance in the computer system. For example, a user preference for higher-performance graphics may create more dependencies on a powerful GPU than a user preference for lower-performance graphics.

After a switch is made to a higher-performance GPU to drive the display, a switch back to a lower-performance GPU may not be made until all dependencies on the higher-performance GPU are removed. For example, a discrete GPU may drive the display during execution of applications that require video playback, use graphics libraries, request GPU support, and/or are otherwise graphics-intensive. Once all graphics-intensive applications and/or operations are terminated, the computer system may switch to an embedded GPU to save power. Policy-based switching between GPUs in the computer system may thus increase graphics performance for applications that have higher graphics-processing loads while conserving power when such applications are not being executed. As discussed below, policy-based switching may additionally allow for the dynamic configuration of graphics processing in the computer system that is independent of the applications installed on the computer system, as well as seamless switching between GPUs through events that trigger the configuring of a GPU in the background prior to switching to the GPU.

Figure 1:
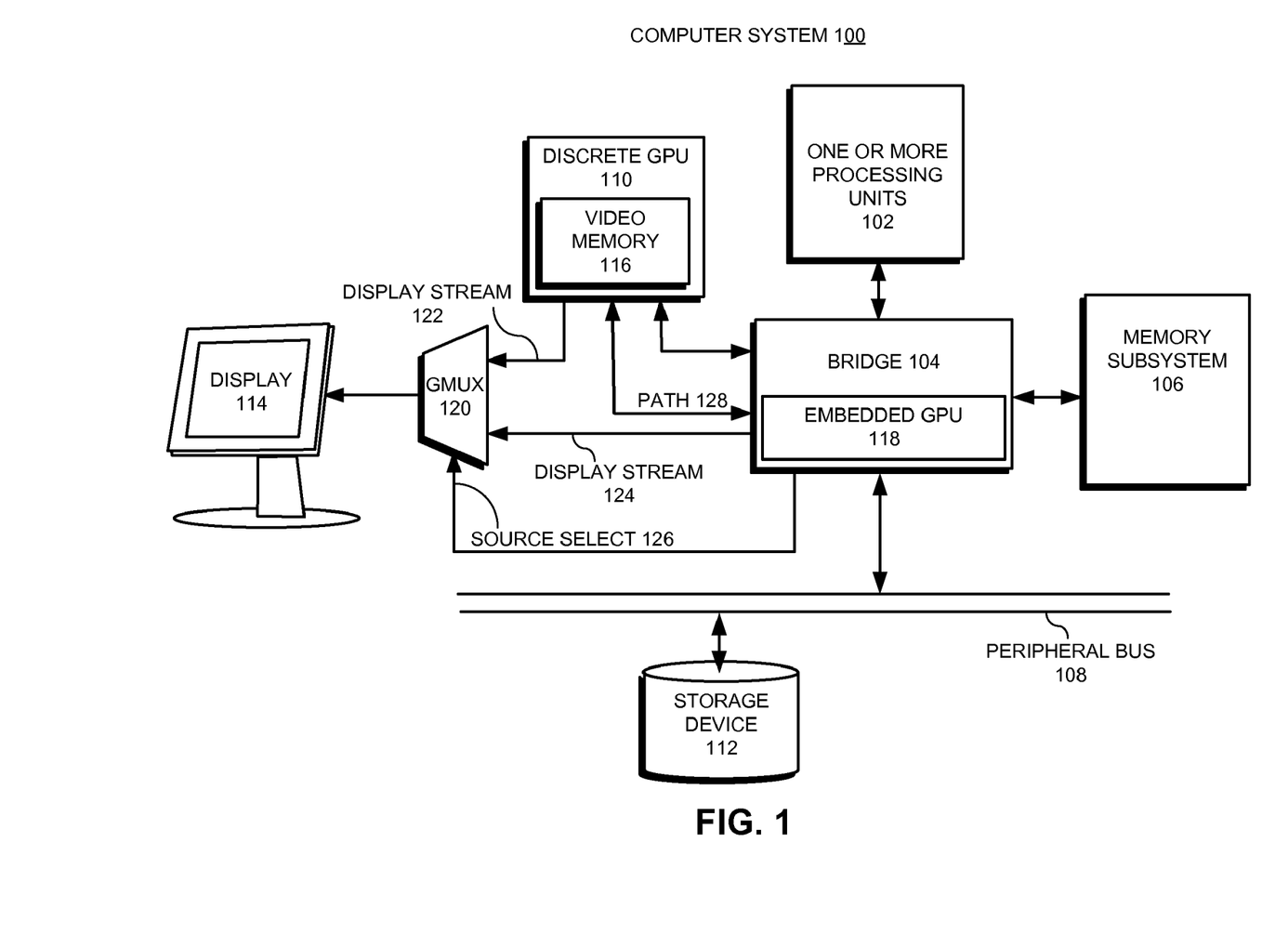
FIG. 1 illustrates a computer system which can switch between different graphics sources to drive the same display in accordance with one embodiment.

FIG. 1 illustrates a computer system 100 in accordance with one embodiment. Computer system 100 may correspond to a personal computer, laptop computer, portable electronic device, workstation, and/or other electronic device that can switch between two graphics sources to drive a display. Referring to FIG. 1, the two graphics sources include (1) a discrete GPU 110 and (2) an embedded GPU 118, which can each independently drive display 114. The graphics source driving display 114 is determined by GPU multiplexer (GMUX) 120, which selects between GPU 110 and GPU 118. Hence, computer system 100 may use GMUX 120 to select a graphics source based on current operation conditions.

During operation, display stream 122 from discrete GPU 110 and display stream 124 from embedded GPU 118 both feed into data inputs of GMUX 120. Source select signal 126 feeds into a select input of GMUX 120 and determines which one of the two graphics sources will drive display 114. In the illustrated embodiment, source select signal 126 is produced by bridge chip 104, which includes specific logic for generating source select signal 126. (Note that source select signal 126 can also be produced by a logic block other than bridge chip 104. For example, source select signal 126 can be produced by one or more processing units 102.) The display stream from the selected graphics source then feeds into display 114.

In one embodiment, discrete GPU 110 and embedded GPU 118 communicate through data path 128 to synchronize their display streams. Note that synchronizing the display streams can involve synchronizing both the respective timing signals and the respective data signals.

In one embodiment, discrete GPU 110 is a high-performance GPU that consumes a significant amount of power relative to embedded GPU 118, a lower-performance GPU that consumes a smaller amount of power. In this embodiment, when the graphics-processing load is light, the system switches from using discrete GPU 110 to using embedded GPU 118 to drive display 114, and subsequently powers down discrete GPU 110, thereby saving power. On the other hand, when the graphics-processing load becomes heavy again, the system switches graphics sources from embedded GPU 118 back to discrete GPU 110.

Although we have described a system that includes a discrete GPU and an embedded GPU, the disclosed technique can generally work in any computer system comprising two or more GPUs, each of which may independently drive display 114. Moreover, GPUs in the same computer system may have different operating characteristics and power-consumption levels. For example, the computer system may switch between a general-purpose processor in one or more processing units 102 (e.g., central processing unit (CPU)) and a special-purpose GPU (e.g., discrete GPU 110) to drive display 114. Hence, the disclosed technique is not limited to the specific embodiment illustrated in FIG. 1.

Also note that the above-described process for switching between graphics sources does not involve shutting down or reinitializing the computer system. As a result, the switching process can take substantially less time than it would have if a reinitialization had been required. Consequently, the disclosed technique facilitates rapid and frequent switching between the graphics sources.

In one or more embodiments, computer system 100 provides policy-based switching between discrete GPU 110 and embedded GPU 118 as the signal source for driving display 114. In particular, computer system 100 may select discrete GPU 110 or embedded GPU 118 to drive display 114 based on a policy related to graphical performance in computer system 100. The policy may associate events in the computer system with dependencies on individual GPUs; events associated with higher graphical performance requirements may be associated with discrete GPU 110, while events associated with lower graphical performance requirements may be associated with embedded GPU 118.

Computer system 100 may begin by using embedded GPU 118 as the signal source for driving display 114 until an event associated with a dependency on discrete GPU 110 is detected through an application programming interface (API) associated with a graphics library, video playback, and/or a window manager. When an application makes function calls through one or more predetermined APIs, the system can infer that either more-powerful or less-powerful graphics-processing capabilities will be needed by the application. In response to the one or more function calls, the system can initiate a GPU switch. For example, the dependency may correspond to use (e.g., linking, loading, method calls, etc.) of OpenGL (OpenGL™ is a registered trademark of Silicon Graphics, Inc.) in the computer system and/or QuickTime (QuickTime™ is a registered trademark of Apple Inc.) playback of decodable (e.g., encrypted, compressed, encoded, etc.) video content. The dependency may also be triggered by individual applications and/or users through explicit requests to switch from embedded GPU 118 to discrete GPU 110 (e.g., through the graphics library and/or window manager) during application execution and/or user preferences associated with graphical performance in the computer system.

Note that the GPU switch is not necessarily triggered by or associated with an explicit API call. More specifically, the GPU switch may be triggered by an event which corresponds to: (1) launch of an application associated with the dependency on the second GPU; (2) termination of an application associated with a dependency on a GPU; (3) invocation of the request to switch from the first GPU to the second GPU (e.g., by an application); (4) switching modes or functions within an applications; and (5) use of a graphics library, and/or video playback of decodable (e.g., digital rights management (DRM)) content. Events and/or dependencies associated with policy-based switching between GPUs are discussed in further detail below with respect to FIG. 3.

In response to the event, computer system 100 may switch from embedded GPU 118 to discrete GPU 110 as the signal source for driving display 114. During the switch, threads that depend on discrete GPU 110 may be blocked until discrete GPU 110 is fully driving display 114. A switch back to embedded GPU 118 as the signal source may be made after all dependencies on discrete GPU 110 are removed. For example, computer system 100 may revert to embedded GPU 118 as the signal source after video playback of hardware decodable content, use of graphics libraries, and/or execution of applications associated with discrete GPU 110 is complete.

Because switches between discrete GPU 110 and embedded GPU 118 are based on events associated with graphics processing requirements in computer system 100, computer system 100 may include functionality to respond rapidly to changes in the graphical performance requirements of applications and users, thereby improving both graphical performance and power savings. Furthermore, the detection of such events through one or more APIs in computer system 100 may allow the display of graphics in computer system 100 to be dynamically configured independently of the applications installed on computer system 100. Finally, the use of an adaptable policy to govern switching between GPUs may allow individual applications and/or users associated with computer system 100 to modulate the use of embedded GPU 118 and/or discrete GPU 110 in driving display 114.

Figure 2:
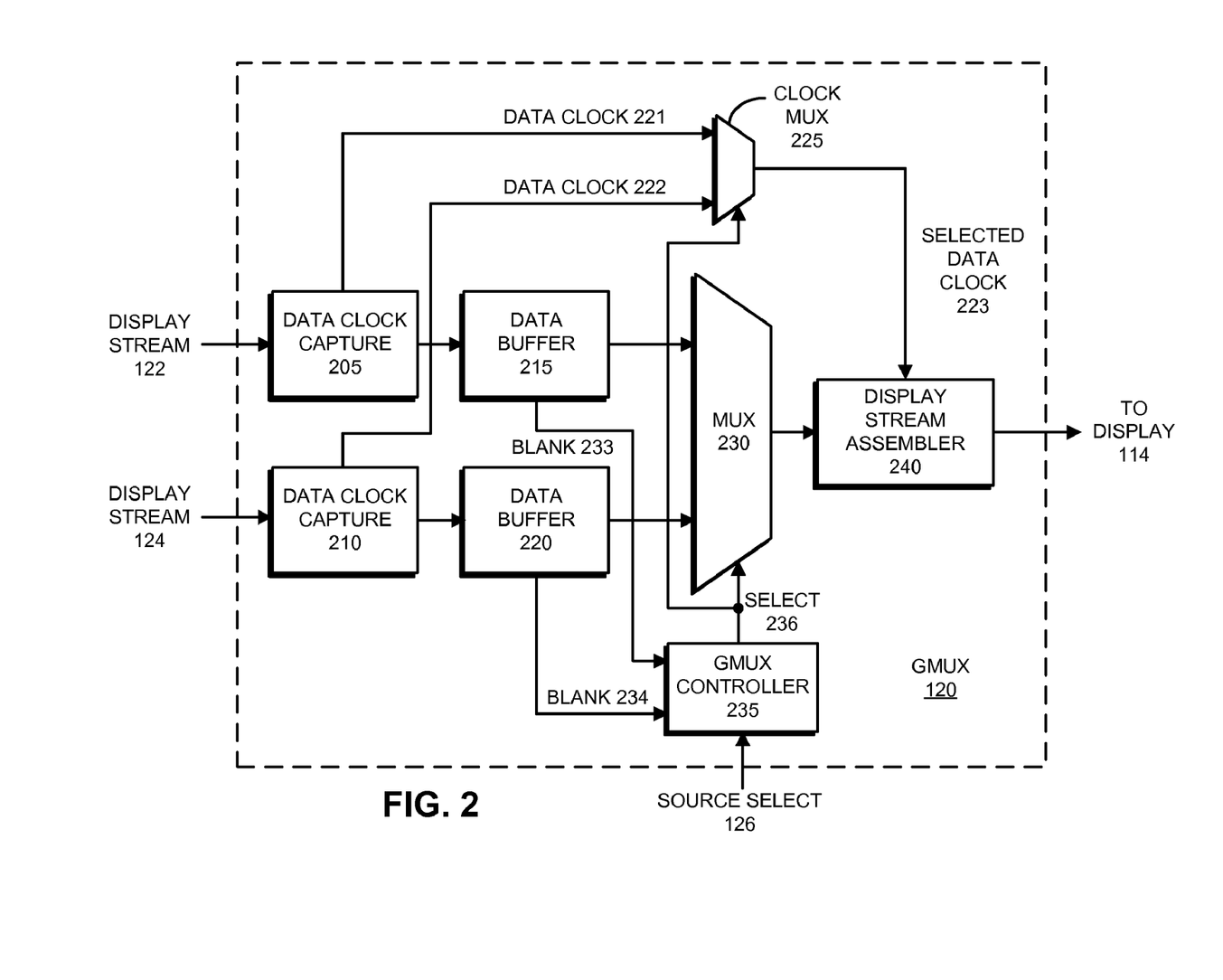
FIG. 2 illustrates the structure of a graphics multiplexer in accordance with one embodiment.

FIG. 2 illustrates the internal structure of the graphics multiplexer 120 (described above with reference to FIG. 1) in accordance with one embodiment. Referring to FIG. 2, display stream 122 from discrete GPU 110 and display stream 124 from embedded GPU 118 feed into data clock capture blocks 205 and 210 respectively. Data clock capture blocks 205 and 210 de-serialize display streams 122 and 124 and also extract respective data clock signals 221 and 222.

These data clock signals 221 and 222 feed into clock MUX 225, which selects one of data clock signals 221 and 222 to be forwarded to display stream assembler 240. In one embodiment, the GMUX controller 235 provides select signal 236 to clock MUX 225. Alternatively, select signal 236 can be provided by other sources, such as a processor in one or more processing units 102 or another controller.

Next, display streams 122 and 124, with data clocks separated, feed into data buffers 215 and 220 respectively. Data buffers 215 and 220 examine display streams 122 and 124 to determine when blanking intervals occur, and produce respective blanking interval signals 233 and 234. Data buffers 215 and 220 also produce output data streams that feed into data MUX 230.

Blanking interval signals 233 and 234 feed into GMUX controller 235, which compares blanking intervals 233 and 234 to determine how much overlap, if any, exists between the blanking intervals of display streams 122 and 124. (Note that blanking interval signals 233 and 234 can indicate vertical or horizontal blanking intervals.) If GMUX controller 235 determines that blanking intervals 233 and 234 have a sufficient amount of overlap, GMUX controller 235 asserts select signal 236 as the blanking intervals begin to overlap. This causes clock MUX 225 and data MUX 230 to switch between display streams 122 and 124 during the period when their blanking intervals overlap. Because the switching occurs during the blanking intervals, the switching process will not be visible on display 114.

Finally, the output of data MUX 230 and the selected data clock 223 feed into display stream assembler 240, which re-serializes the data stream before sending the data stream to display 114.

Figure 3:
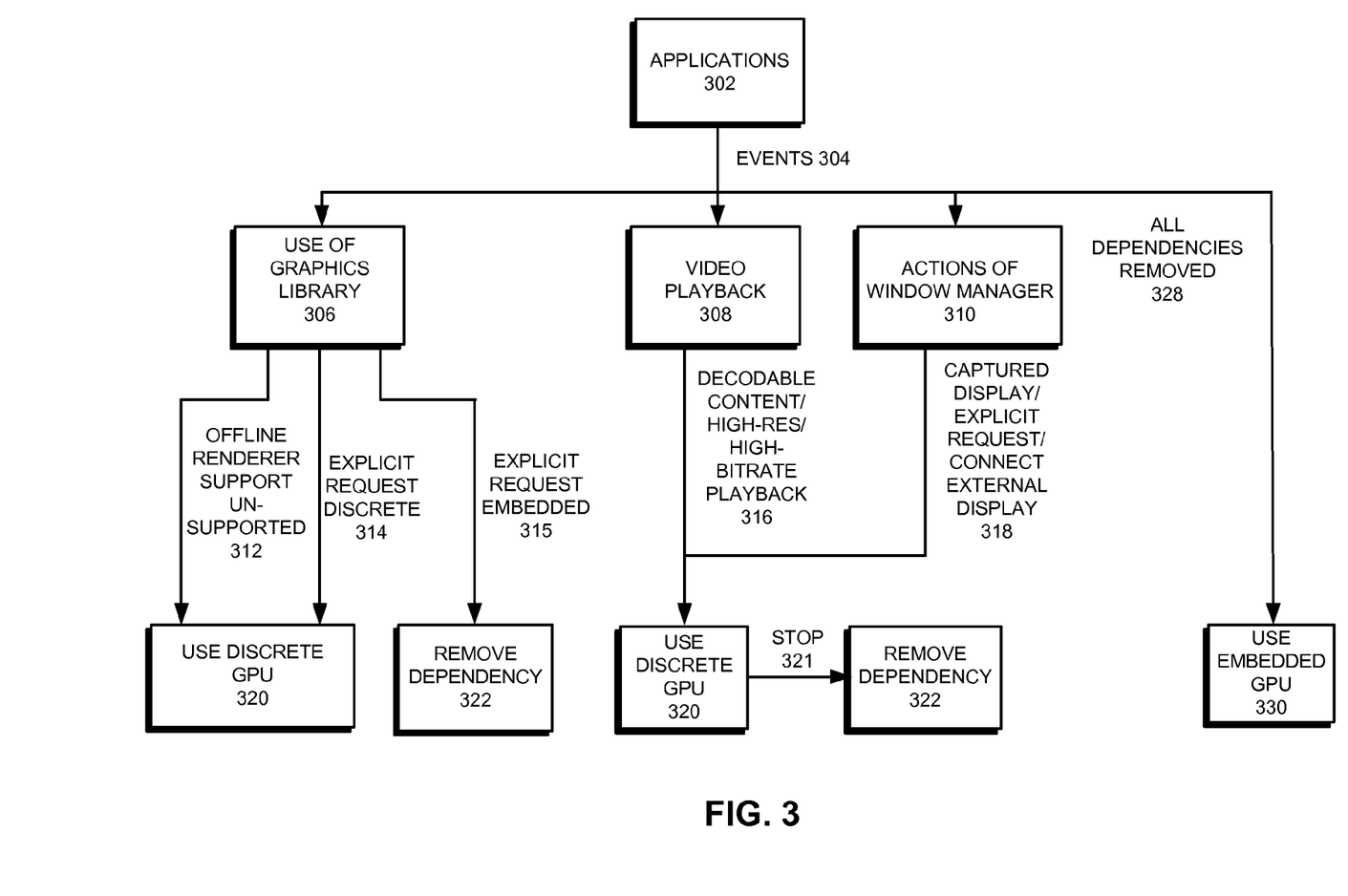
FIG. 3 shows an exemplary policy for switching between GPUs in a computer system in accordance with one embodiment.

FIG. 3 presents a diagram illustrating an exemplary policy for switching between GPUs in a computer system in accordance with one embodiment. As described above, the policy may be used to switch between two dissimilar GPUs, such as a discrete GPU and an embedded GPU or a GPU and a CPU, as signal sources for driving a display in a computer system. Furthermore, the policy may specify the use of a certain GPU based on events 304, which for example may be generated by executing applications through an API in the computer system. In particular, the policy may identify events associated with dependencies on a higher-performance GPU (e.g., discrete GPU 110), as well as events that remove dependencies on the higher-performance GPU.

As shown in FIG. 3, events 304 may be associated with use of a graphics library 306, video playback 308, and/or actions of a window manager 310. Graphics library 306 may allow applications 302 to use graphics hardware acceleration on the computer system. As a result, use of graphics library 306 may be associated with higher graphical performance requirements and trigger use of a discrete GPU 320. For example, a three-dimensional (3D) computer game may use OpenGL to render complex scenes and characters using graphics hardware acceleration. Moreover, the 3D computer game may require the functionality of a discrete GPU to render and display graphics in real-time.

In particular, use of the discrete GPU 320 may be triggered if the application does not implicitly support both GPUs meaning the offline renderer is unsupported 312 during a call to graphics library 306 and/or an application makes an explicit request for the discrete GPU 314 through a call to a function in graphics library 306 to use the discrete GPU 320. On the other hand, if an application supports offline rendering, the policy may not dictate an immediate switch to the discrete GPU. Instead, the policy may allow the application to configure the use of both GPUs through additional method calls to graphics library 306. Moreover, an application may remove a previously created dependency 322 on the discrete GPU through a subsequent explicit request 315 to use the embedded GPU.

As mentioned previously, use of graphics library 306 may correspond to linking to graphics library 306, loading of graphics library 306 during application execution, and/or method calls to graphics library 306 by an application. As a result, a switch to the discrete GPU may be triggered before application execution, during application execution, and/or during the use of graphics hardware acceleration by the application. In addition, events such as linking or loading may be used to configure the discrete GPU so that a seamless switch to the discrete GPU may be made when the application finally utilizes graphics hardware acceleration through graphics library 306. See, for example, the description with respect to FIG. 5 for more details.

Video playback 308 may be associated with a dependency on the discrete GPU if decodable content and/or high-resolution/high-bitrate playback 316 are involved. For example, the discrete GPU may be used 320 for playback if the video content is encoded, encrypted, and/or compressed using mechanisms that allow for decoding, decryption, and/or decompression by the discrete GPU. The use of the discrete GPU 320 to decode video content may further be determined by the resolution and/or bitrate of the video being played. For example, the policy may specify decoding by the CPU of the computer system for low-resolution video and decoding by the discrete GPU 320 for high-resolution/high-bitrate video. Alternatively, the discrete GPU may be used in an offline context to decode video content that is then displayed on the computer system by the embedded GPU. Dependencies related to video playback 308 may be removed 322 once video playback stops 321.

An action with window manager 310 may also trigger a switch to the discrete GPU 320, for example in the event of a captured display, explicit request, and/or connection of an external display 318. More specifically, the capturing of a display by an application, wherein the application assumes full control over what is presented on the display screen (e.g., "full screen"), may change the configuration of displays in the computer system and trigger the use of graphics library 306 which, in turn, may prompt the use of discrete GPU 320. Similarly, an application may make an explicit request to use the discrete GPU and/or request GPU support through window manager 310, thus triggering a switch to the discrete GPU 320. The connection of an external display to the computer system may also increase the graphical performance demands of the computer system and cause the discrete GPU to be used 320. When these triggering conditions stop 321, for example because of release of a captured display, stopping of GPU support, an explicit request to use the embedded GPU 315, and/or disconnection of the external display, the stoppage may trigger the removal of one or more dependencies 322 on the discrete GPU.

Finally, the policy may specify the use of the embedded GPU 330 after all dependencies on the discrete GPU are removed 328. In other words, a single dependency on the discrete GPU may trigger a switch to the discrete GPU, while the embedded GPU is used when no executing applications have dependencies on the discrete GPU.

Those skilled in the art will appreciate that different policies for switching between GPUs may be used based on user preferences, application requirements, and/or GPU features associated with the computer system. For example, dependencies associated with use of a GPU's features may exist if some of the features are not available on other GPUs in the computer system. Along the same lines, user preferences for higher-performance graphics may prompt the identification of additional dependencies on the discrete GPU in the policy, while user preferences for lower-performance graphics may decrease the number of dependencies on the discrete GPU in the policy.

Also note that all of the dependencies for an application can be removed upon termination of the application.

Figure 4:
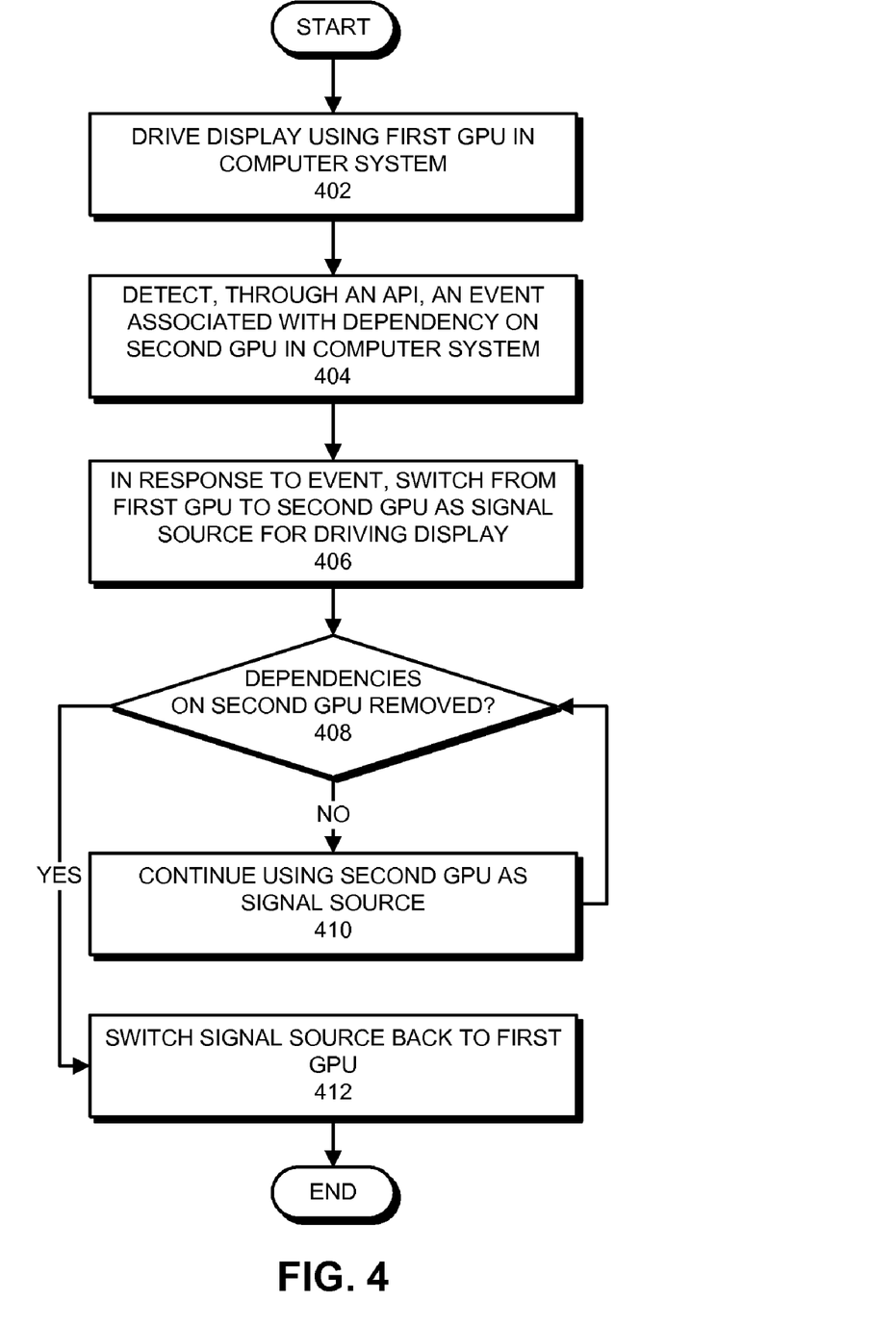
FIG. 4 shows a flowchart illustrating the process of configuring a computer system in accordance with one embodiment.

FIG. 4 shows a flowchart illustrating the process of configuring a computer system in accordance with one embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, a display is driven using a first GPU in the computer system (operation 402). The first GPU may correspond to a low-power and/or low-performance GPU, such as a general-purpose processor executing graphics code and/or an integrated GPU. Next, an event associated with a dependency on a second GPU in the computer system is detected through an API (operation 404). The second GPU may be associated with higher performance and power consumption than the first GPU. For example, the second GPU may correspond to a discrete GPU if the first GPU is an integrated GPU, or the second GPU may correspond to a special-purpose GPU if the first GPU is a CPU. The API may be associated with a graphics library, video playback, and/or a window manager. As a result, events detected through the API may be used to assess the graphical performance requirements of the computer system and trigger switches between the first GPU and second GPU.

In response to the event, a switch from the first GPU to the second GPU as a signal source for driving the display is made (operation 406). As described above, a seamless switch between the first GPU and the second GPU may be facilitated by configuring the second GPU prior to the switch. For example, configuring of the second GPU may begin upon loading of a graphics library into an application's executable, while the switch to the second GPU may not occur until the application performs a "draw" operation using the graphics library.

The second GPU may continue to be used as the signal source until all dependencies on the second GPU are removed (operation 408). For example, the second GPU may continue to drive the display until all graphics-intensive applications and/or operations specified by a policy associated with the computer system have completed execution. If dependencies still exist, the second GPU continues to be used as the signal source (operation 410). However, if dependencies on the second GPU no longer exist, the signal source is switched back to the first GPU (operation 412) to conserve power in the computer system.

Figure 5:
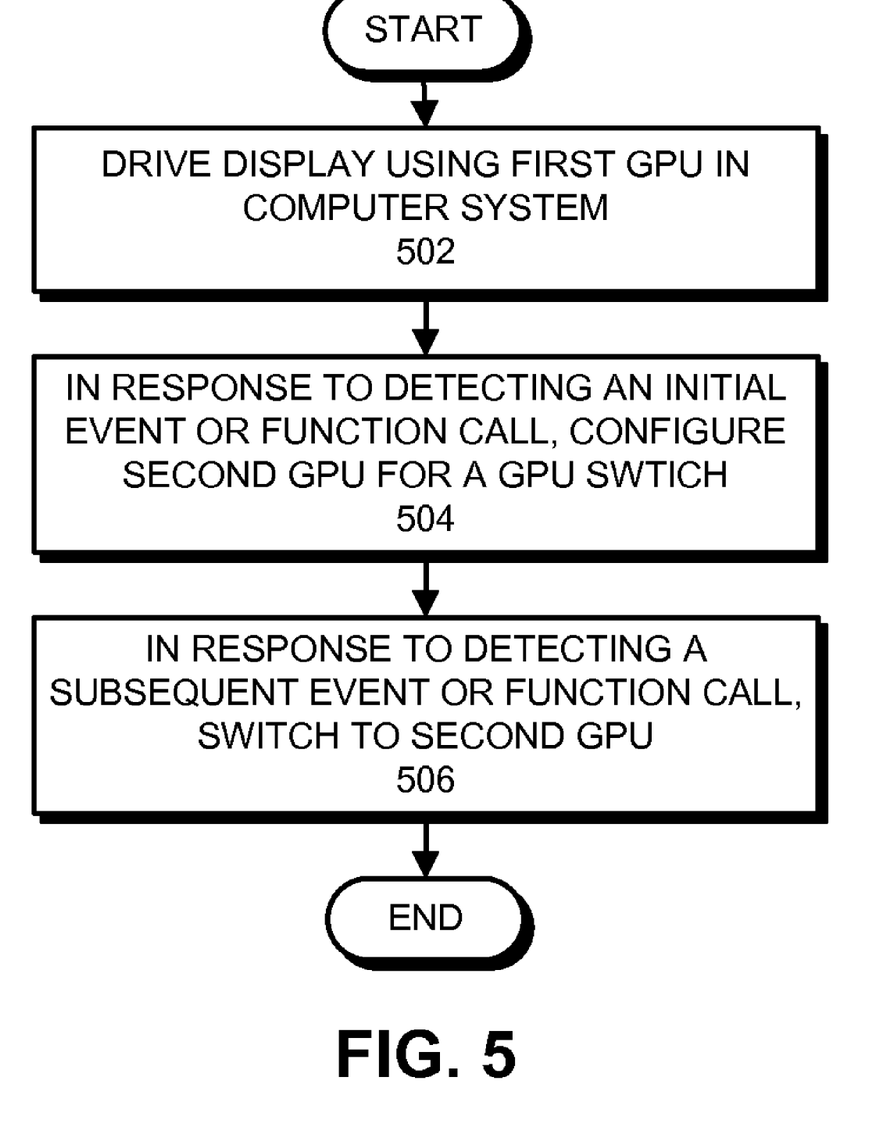
FIG. 5 shows another flowchart illustrating a GPU-switching process in accordance with one embodiment.

FIG. 5 presents another flowchart illustrating a GPU-switching process in accordance with one embodiment.

Initially, the display is driven using the first GPU (operation 502). Next, in response to detecting an initial event or function call, the system configures the second GPU for a GPU switch (operation 504). In one embodiment, the switch to the second GPU occurs immediately so that the display is driven by the second GPU. In another embodiment, the switch takes place in response to detecting a subsequent event or function call (operation 506).

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for configuring a computer system, comprising:
   driving a display using a first graphics-processing unit (GPU) in a computer system;
   identifying a policy that specifies two or more events at least one of which identifies one or more dependencies between the first GPU and a second GPU, the one or more dependencies comprising one of linking to a graphics library, loading of the graphics library during application execution, and method calls to the graphics library, wherein the policy is satisfied only if all of the two or more events are detected;
   detecting that the policy is satisfied;
   switching, in response to detecting the policy was satisfied, from the first GPU to the second GPU as a signal source for driving the display;
   detecting, after the act of switching, that the policy is no longer satisfied; and switching, in response to detecting the policy is no longer satisfied, from the second GPU to the first GPU.

2. The method of claim 1, wherein the two or more events are detected through one or more application programming interfaces (APIs).

3. The method of claim 2, wherein the one or more APIs are associated with at least one of: the graphics library, video playback, or a window manager.

4. The method of claim 3, wherein the one or more dependencies between the first and second GPUs correspond to at least one of:
   use of the graphics library in the computer system;
   video playback of decodable content;
   a request to switch from the first GPU to the second GPU;
   a user preference associated with graphical performance in the computer system;
   and a system event, such as plugging in a peripheral or a display.

5. The method of claim 4, wherein the request is made to the window manager or the graphics library.

6. The method of claim 1, wherein at least one of the two or more events include:
   initialization of an application associated with the one or more dependencies on the second GPU;
   invocation of a request to switch from the first GPU to the second GPU;
   use of the graphics library;
   video playback of a decodable content; and
   a system event, such as plugging in a peripheral or a display.

7. The method of claim 1,
   wherein the first GPU is a low-power GPU which is integrated into a system chipset, and the second GPU is a high-power GPU which resides on a discrete GPU chip, and
   wherein the first GPU and the second GPU have substantially identical circuitry and similar capabilities.

8. The method of claim 1, wherein the first GPU is a general-purpose processor running graphics code, and the second GPU is a special-purpose GPU.

9. A computer system that switches from a first graphics processor to a second graphics processor to drive a display, comprising:
   a first graphics-processing unit (GPU); and
   a second GPU;
   wherein the computer system is configured to:
   identify a policy that specifies two or more events at least one of which identifies one or more dependencies between the first GPU and a second GPU, the one or more dependencies comprising one of linking to a graphics library, loading of the graphics library during application execution, and method calls to the graphics library, wherein the policy is satisfied only if all of the two or more events are detected,
   detect that the policy is satisfied,
   switch, in response to detecting the policy was satisfied, from the first GPU to the second GPU as a signal source for driving the display,
   detect, after the act of switching, that the policy is no longer satisfied, and switch, in response to detecting the policy is no longer satisfied, from the second GPU to the first GPU.

10. The computer system of claim 9, wherein the computer system is configured to detect the one or more events through one or more APIs.

11. The computer system of claim 10, wherein the one or more APIs are associated with at least one of: the graphics library, video playback, or a window manager.

12. The computer system of claim 11, wherein the one or more dependencies between the first and second GPUs correspond to at least one of:

use of the graphics library in the computer system;
video playback of decodable content;
a request to switch from the first GPU to the second GPU;
a user preference associated with graphical performance in the computer system;
and a system event, such as plugging in a peripheral or a display.

13. The computer system of claim 12, wherein the computer system is configured to make the request to the window manager or the graphics library.

14. The computer system of claim 9, wherein at least one of the two or more events include:
initialization of an application associated with the one or more dependencies on the second GPU;
invocation of a request to switch from the first GPU to the second GPU;
use of the graphics library;
video playback of a hardware decodable content; and
a system event, such as plugging in a peripheral or a display.

15. A non-transitory computer-readable storage medium storing instructions that when executed by a computer cause the computer to:
drive a display using a first graphics-processing unit (GPU);
identify a policy that specifies two or more events at least one of which identifies one or more dependencies between the first GPU and a second GPU, the one or more dependencies comprising one of linking to a graphics library, loading of the graphics library during application execution, and method calls to the graphics library, wherein the policy is satisfied only if all of the two or more events are detected;
detect that the policy is satisfied;
switch, in response to executing instructions to detect the policy is satisfied, from the first GPU to the second GPU as a signal source for driving the display;
detect, after executing the instructions to switch, that the policy is no longer satisfied; and
switch, after executing the instructions to detect the policy is no longer satisfied, from the second GPU to the first GPU.

16. The computer-readable storage medium of claim 15, wherein the instructions to detect that the policy is satisfied comprise instruction to detect at least one of the two or more events through one or more APIs.

17. The computer-readable storage medium of claim 16, wherein the one or more APIs are associated with at least one of: the graphics library, video playback, or a window manager.

18. The computer-readable storage medium of claim 17, wherein the one or more dependencies between the first and second GPUs correspond to at least one of:
use of the graphics library in the computer system;
video playback of decodable content;
a request to switch from the first GPU to the second GPU;
a user preference associated with graphical performance in the computer system;
and a system event, such as plugging in a peripheral or a display.

19. The computer-readable storage medium of claim 18, wherein the request is made to the window manager or the graphics library.

20. The computer-readable storage medium of claim 16, wherein at least one of the two or more events include:
initialization of an application associated with the one or more dependencies on the second GPU;
invocation of a request to switch from the first GPU to the second GPU;
use of the graphics library;
video playback of a decodable content; and
a system event, such as plugging in a peripheral or a display.

* * * * *